PITCH CIRCLES OF PINION-SIDE GEAR MESH

PITCH CIRCLES OF PINION-PINION MESH

INVENTOR.
Oliver E. Saari
BY
His Att'ys

Dec. 20, 1966    O. E. SAARI    3,292,456
SPIN LIMITING DIFFERENTIAL
Filed April 30, 1964    9 Sheets-Sheet 2
Fig. 4
|  | INTERNAL | EXTERNAL |
|---|---|---|
| P | $\frac{R}{r}$ | $\frac{R}{r}$ |
| 2 | 2 | NO SOLUTION |
| 4 | 2.4142 | .4142 |
| 6 | 3 | 1 |
| 8 | 3.6131 | 1.6131 |
| 10 | 4.2361 | 2.2361 |
| 12 | 4.8637 | 2.8637 |
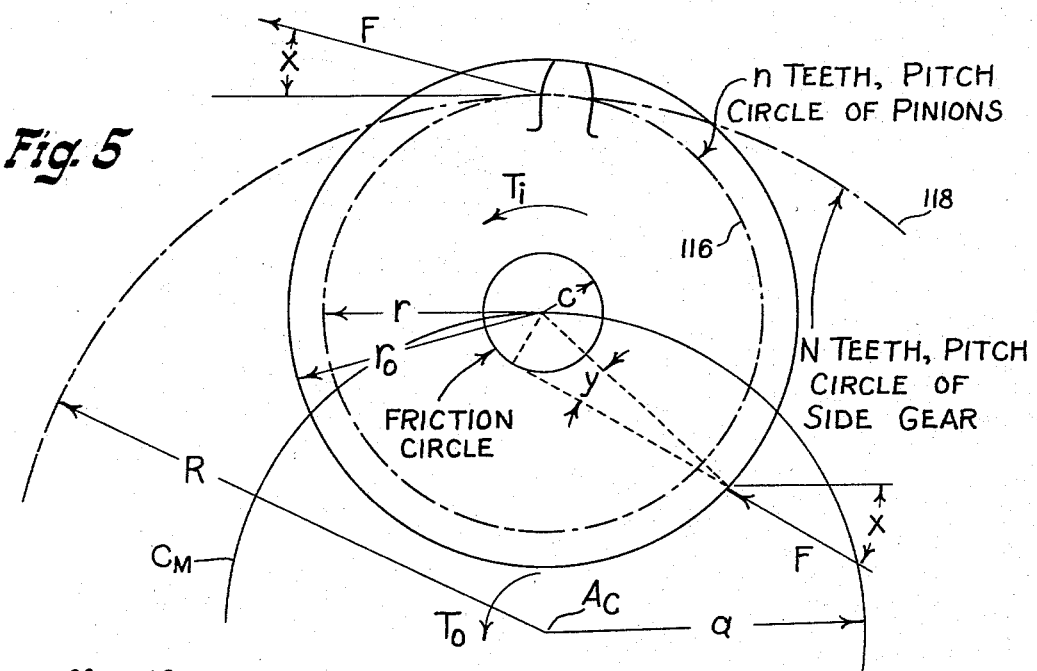
Fig. 5
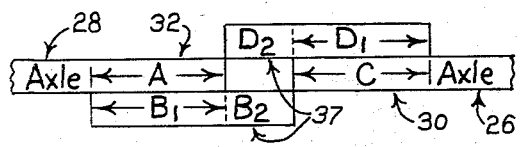
Fig. 6
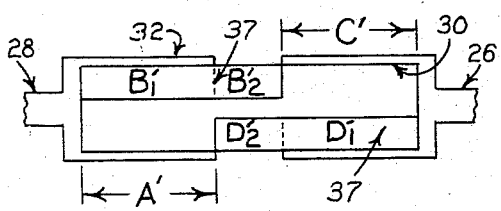
Fig. 7
INVENTOR.
Oliver E. Saari
BY
His Att'ys Dec. 20, 1966 O. E. SAARI 3,292,456
SPIN LIMITING DIFFERENTIAL
Filed April 30, 1964 9 Sheets-Sheet 3

INVENTOR.
Oliver E. Saari
BY
His Att'ys

Dec. 20, 1966  O. E. SAARI  3,292,456
SPIN LIMITING DIFFERENTIAL
Filed April 30, 1964  9 Sheets-Sheet 4

INVENTOR.
Oliver E. Saari
BY
His Att'ys

Dec. 20, 1966     O. E. SAARI     3,292,456
SPIN LIMITING DIFFERENTIAL
Filed April 30, 1964     9 Sheets-Sheet 5
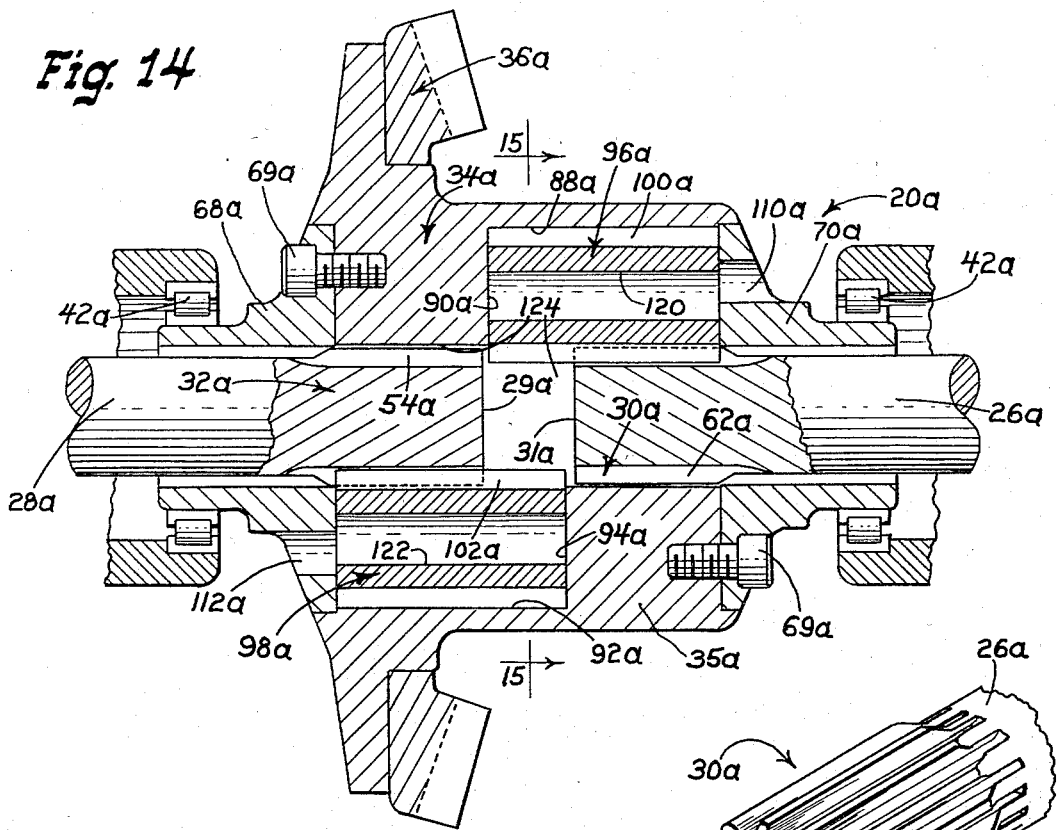
*Fig. 14*
*Fig. 15*
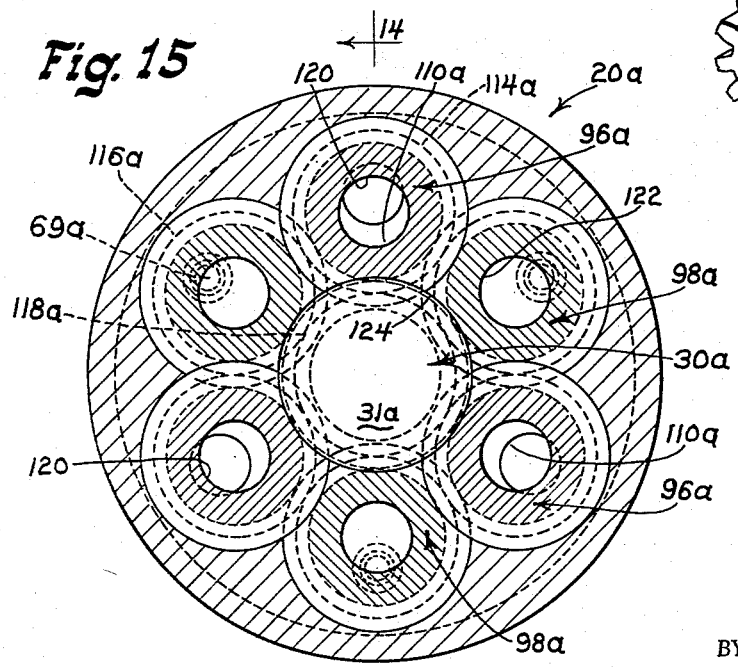
*Fig. 16*
INVENTOR.
Oliver E. Saari
BY
His Att'ys

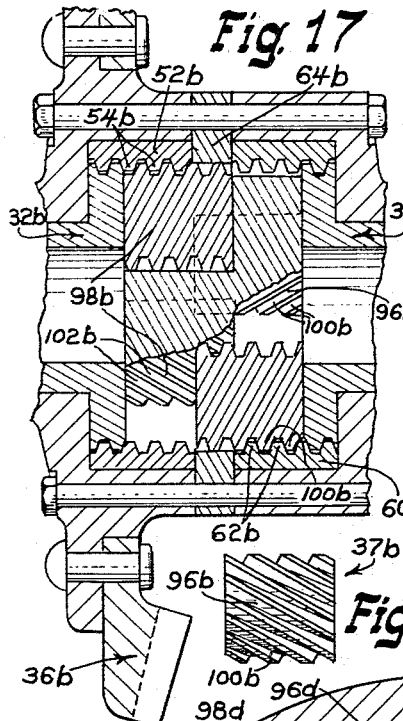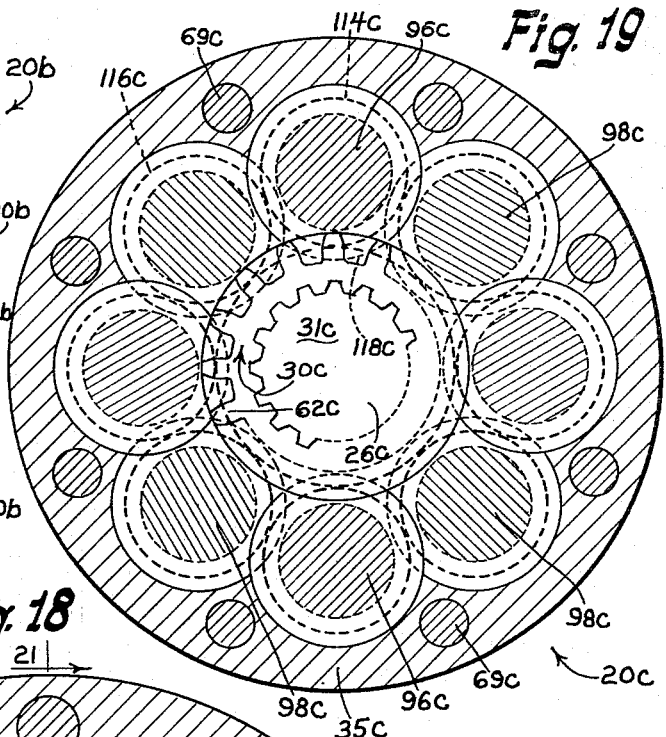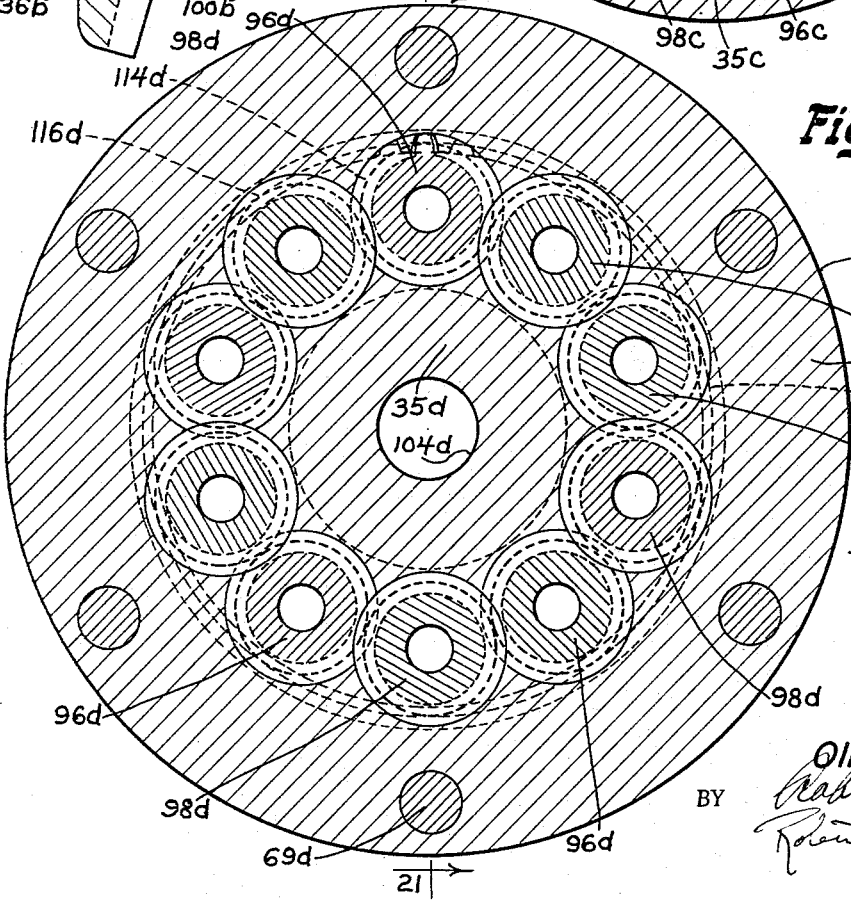

Dec. 20, 1966  O. E. SAARI  3,292,456
SPIN LIMITING DIFFERENTIAL
Filed April 30, 1964  9 Sheets-Sheet 7

INVENTOR.
Oliver E. Saari
BY
His Att'ys

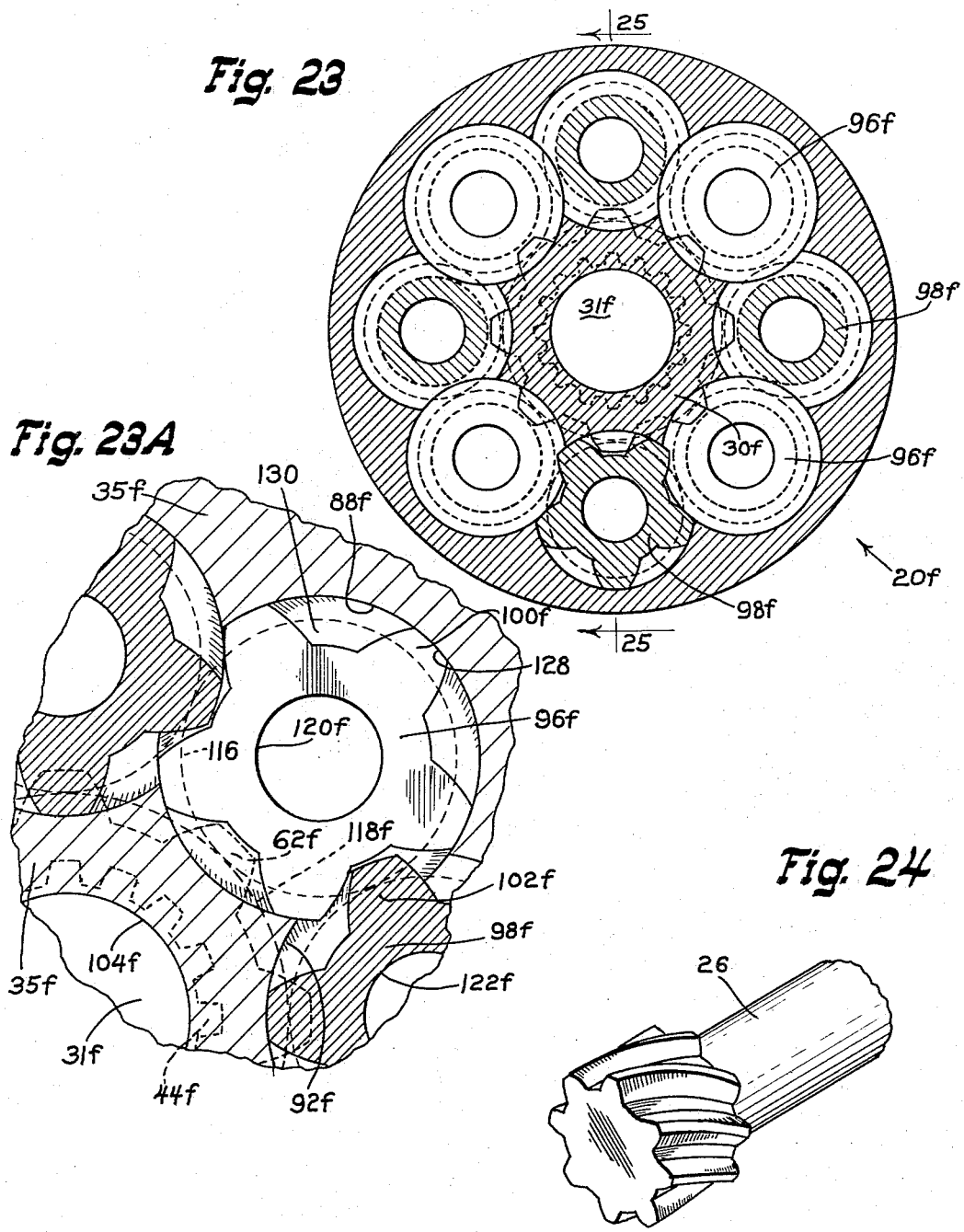

Dec. 20, 1966  O. E. SAARI  3,292,456
SPIN LIMITING DIFFERENTIAL
Filed April 30, 1964  9 Sheets-Sheet 9
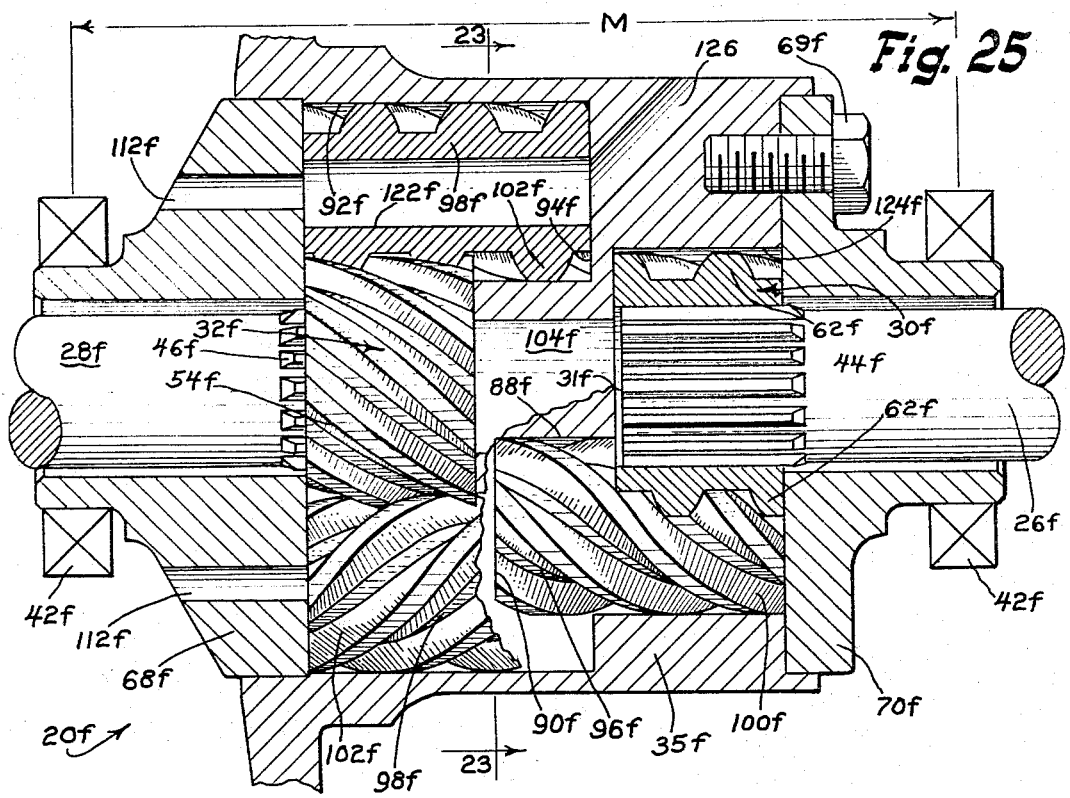
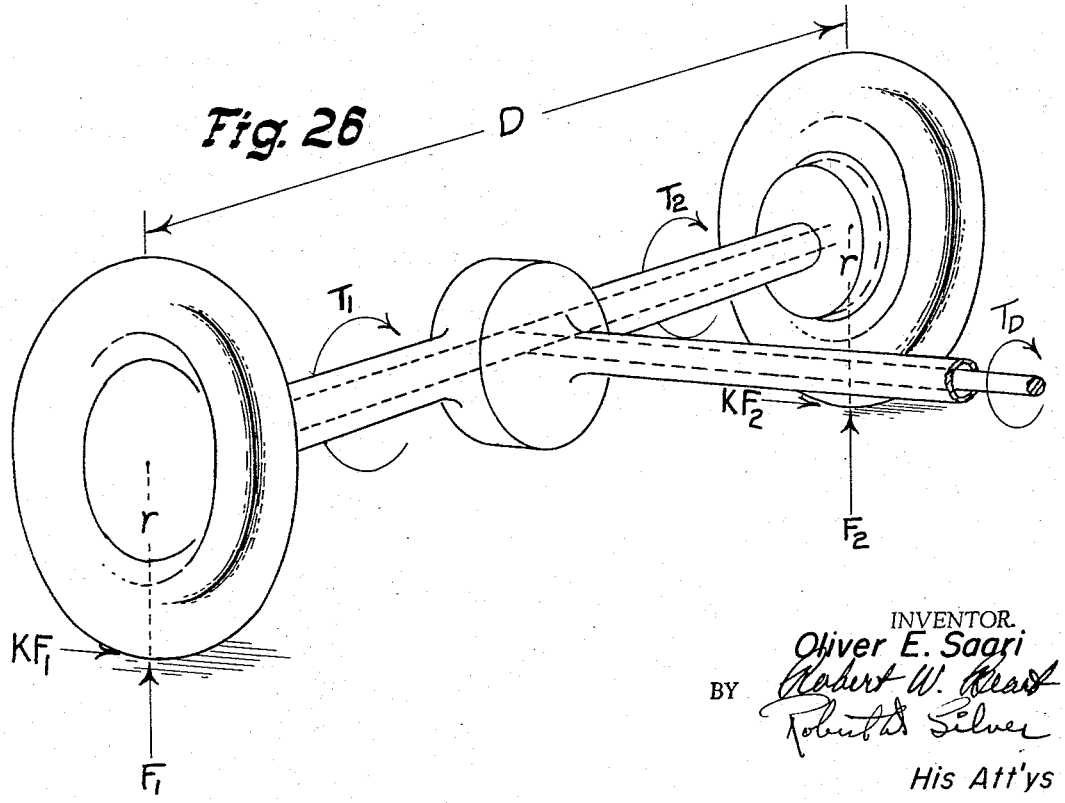
INVENTOR.
Oliver E. Saari
BY
His Att'ys United States Patent Office 3,292,456
Patented Dec. 20, 1966

3,292,456
SPIN LIMITING DIFFERENTIAL
Oliver E. Saari, Elmhurst, Ill., assignor to Illinois Tool Works Inc., Chicago, Ill., a corporation of Delaware
Filed Apr. 30, 1964, Ser. No. 363,934
17 Claims. (Cl. 74—711)

This invention relates in general to differentials and more particularly relates to spin limiting differentials.

A familiar problem to automobile drivers is the situation where one rear driving wheel is located on ice or mud providing very poor traction while the other wheel is on dry ground or surface providing better traction. The wheel with the poor traction spins and the wheel with the good traction stands still. Various prior art devices for overcoming this problem have been suggested and some are in commercial usage.

Among the prior art devices providing a semi-locking differential or a selectively locking differential are various types of clutch mechanisms which come into play when a predetermined amount of relative motion occurs between the shaft which drives the automobile or other vehicle. These devices are generally cumbersome and involve a number of moving parts of relatively high cost. Other types of prior art differentials of this general category are also available but have not found ready acceptance for one or more of the following: namely, too high a degree of precision is needed between cooperating parts, too high a cost, lack of strength within reasonable size parameters, inherent bulkiness, difficult to assemble and repair, difficult to lubricate, noisy, etc.

As will be appreciated, it is necessary that moving vehicles having a single driving source to more than one wheel which must be able to go around corners, must permit a difference in the speeds of the driving members (wheels and the like) unless one wheel is going to skid. The instant invention will be discussed in terms of an automobile, however, it is to be expressly noted that this is to be considered illustrative rather than limiting since certain forms of the invention are adapted for use in very heavy duty applications and certain other forms are particularly adapted for relatively light duty applications where cost is a major consideration.

The difference in the relative speeds of the two axles on the driving wheels of an automobile is relatively low during the cornering operation. However, when one wheel is on ice, mud, or the like, and the other wheel has relatively good traction, the difference in motion of the two shafts may be of a relatively high order. The gear mechanism to provide for the relative motion is generally called the differential and sometimes differentials of the instant type are called spin limiting, semi-locking, or inefficient differentials. However, it must be understood that while, in a sense, a differential may be inefficient, the measure of efficiency of a differential from a "power absorbing" standpoint on a cornering operation is of relatively low order. Thus, while a differential may be only fifty percent efficient, for advantages hereinafter explained, this will result in a power loss on cornering of less than five percent, the five percent figure being equated with a turning radius of an automobile on the order of two axle lengths which is considerably shorter than the turning radius found in most commercial vehicles.

It is a general object of this invention to provide a differential of the spin limiting type which will tend to impart a lessening of the relative motion between two axles without disability to efficient transmission of power to the two axles when the angular restraints thereon are substantially the same so that there is no relative motion therebetween.

Still another object of this invention is to provide a differential of the spin limiting type which is well adapted for heavy duty operational environment.

Still another object of this invention is to provide a spin limiting differential which is relatively compact, is relatively easy to manufacture, assemble and service and otherwise is well adapted for its intended purpose.

A still further object of this invention is to provide a differential of the spin limiting variety where the efficiency of the differential may be selected from a wide range of efficiencies varying from a few percent to a relatively high percent.

Still another object of this invention is to provide a differential of the type set forth wherein the spin limiting action is provided by the meshing action of the gears and pinions and by the rotatable supporting of the pinions on the periphery of the teeth thereof, whereby a relatively large amount of power may be transmitted through the device per unit size.

Another object of this invention is to provide a differential construction of the spin limiting variety which is less expensive to manufacture than the present differentials which do not have the spin limiting characteristic while maintaining a reliability at least equivalent to the present so-called standard differentials and that is more reliable than the presently commercially available spin limiting differentials.

A further object of the invention is to provide the above features in a spin limiting differential which is lighter in weight than so-called standard differentials whereby there is less unsprung axle weight in the automobile, vehicle or the like.

Still another object of the invention is to provide a spin limiting differential as above characterized which may be used in present day axle housings to provide higher strength to weight characteristics.

Still another object of this invention is to provide differentials of the aforenoted type which have a mirror image symmetry and in at least certain forms, are of the type where there is no right and left handedness so that identical pinions and identical side gears may be used to greatly simplify manufacturing operations.

Still another object of the invention is to provide, in certain forms of the invention, a construction wherein the axles per se are formed with gear teeth to form the side gears of the differential.

Still another object of the invention is to provide a differential of the aforenoted type wherein all pinions are identical in size and tooth numbers and are in "full circle mesh" and which in certain forms of the invention, provides dynamic balancing characteristics.

Still another important object of the invention is to provide a differential of the aforenoted type wherein the peripheral tips of the pinion teeth form the journal bearing which supports the pinions in corresponding holes in a carrier means which results in a friction surface which is subjected to the same loads as the gear teeth at a sliding velocity which is higher than the pitch line velocity of the gear which results in a predictable degree of "inefficiency" which is advantageous in a spin limiting differential.

A very important object of this invention is to provide a spin limiting differential which utilizes helical pinions and side gears which permits minimum numbers of teeth and large pressure angles without interruption of tooth contact by utilizing the concept of "contact carry-over" on the helix.

Another object of the invention is to provide a differential as above specified of the "helical" design which affords exceedingly wide "lands" on the pinion teeth which provide for large bearing surface on the side walls of the holes in the carrier means to in turn provide improved wear and strength characteristics.

Still another object of the invention is to provide a differential as set forth hereinbefore of the "helical" type which affords coarse teeth (small numbers of teeth) which in turn provides maximum strength per unit size of differential.

Still another object of this invention is to provide a differential of the "helical" type as above characterized which affords large transverse pressure angles (in the plane of rotation) in the pinion to pinion mesh and in the pinion to side gear mesh resulting in a control of efficiency to thereby design preselected desired inefficiency values into a spin limiting differential.

Still another object of the invention is to provide a differential of the "helical" type as above characterized where there is a uniform bearing support for the pinion as a whole in the pockets of the carrier means since the lead of the individual teeth assures that a land portion thereon will be positioned to receive the reaction forces independent of the particular angular position of the pinion.

Still another object of the invention is to provide a differential of the aforenoted spin limiting type which has a unitary carrier means for supporting the pinion in the pinion to pinion mesh and in the pinion to side gear mesh.

Still another object of this invention is to provide a unitary one piece carrier means as above set forth which is easy to manufacture by mass manufacturing techniques (may simultaneously drill all pinion pockets on one side of the carrier means and then simultaneously drill all of the pockets on the other side of the carrier means) which provides no assembly problems when assembled into the differential (no possibility of misorientation of the pinions in the pinion to pinion mesh and pinion to side gear meshes) and the unitary piece is easy to handle, store, and assemble.

Still another object of the invention is to provide a differential of the "helical" type using a carrier means of the type set forth above which provides good internal bearing surfaces not only for the pinions mounted thereon but also for the end faces of the side gears to take up internally directed thrusts.

Still another object of this invention is to provide a unitary carrier means for mounting pinions in the corresponding pockets in the carrier, said mounting also resulting in a rigid support for any length of pinion that may be used and further provides, in at least certain forms of the invention, that the pinions may be cut off from bar stock which is extruded, rolled or machined with the gear teeth formed therein, there being no possibility of misalignment due to deflections of the shafts normally used with pinions, under load.

Still another object of the invention is to provide a differential of the aforenoted type which is exceedingly easy to lubricate, thus reducing wear and scoring problems.

Still another object of the invention is to provide a spin limiting differential of the aforenoted type having a full circle arrangement of pinions in the phasing mesh wherein each pinion is in equilibrium between one side gear mesh and two phasing meshes whereby the length of the pinion to pinion mesh needs to be only one half of the length of the pinion tooth face meshing with the side gears which compacts the differential in an axial direction, and for any given number of pinions, the "full circle" arrangement permits stronger, coarser pitch tooth design than if the pinion were phased in discrete pairs, all while maintaining a perfectly symmetrical arrangement with respect to tooth forces and bearing forces which is identical from the point of view of either axle.

Another object of this invention is to provide a spin limiting differential of the above type and having a design parameter which affords maximum use of the space available in the differential for strength purposes, said space available being generally determined by the bearing support for the power input means which is generally in the form of a hypoid type ring gear and pinion therefor.

Still another object of this invention is to provide a differential wherein the side gears and the pinions may be made utilizing spur gears which are among the most economical of all gears produced; however, for higher degrees of "inefficiency," precise control of inefficiency, stronger teeth, better bearing in general, helical gears should be used and, in general, the higher the helix angle the lower the efficiency and therefore the greater the spin limiting properties.

A still further object of the invention is to provide a differential concept of the spin limiting variety which applies to external type side gears and to internal type side gears depending upon the design parameters involved in a specific application.

Still another and very important object of this invention is to provide the formulas, rules, and concepts giving utmost latitude to the designer for designs of spin limiting differentials utilizing any even number of pinions in full circle mesh with two side gears of identical size.

The novel features that are characteristic of the invention are set forth with particularity in the appended claims. The invention itself, both as to its organization and its method of operation, together with additional objects and advantages thereof, will best be understood by the following description when read in connection with the accompanying drawings in which:

FIG. 4 is a table of relationship of total number of pinions and the ratios of the radiuses of the side gears to the radiuses of the pinions in both internal and external type of side gear constructions involving my concepts;

FIG. 5 is a semidiagrammatic view of certain relationships used to approximate the efficiency of differentials of different configuration involving my inventive concepts;

FIG. 6 is a semidiagrammatic view of an external type side gear to pinion mesh and pinion to pinion mesh relationship from a "length" standpoint;

FIG. 7 is a view similar to FIG. 6 relating to internal type side gears;

FIG. 14 is a view of another embodiment of my invention in longitudinal section, said differential being of the external type;

FIG. 15 is a sectional view taken along lines 15—15 of FIG. 7;

FIG. 16 is a fragmentary perspective view of the axle with the gear teeth integral with the end thereof as used in the embodiment shown in FIGS. 14 and 15;

FIG. 17 is a semidiagrammatic view partially in section showing a differential using helical type pinions;

FIG. 18 is a plan view of one of the identical helical pinions used in the embodiment of differential shown in FIG. 17;

FIG. 19 is a view similar to FIG. 15 illustrating still another form of differential;

FIG. 20 is a view similar to FIG. 1 illustrating still another form of the invention;

FIG. 23 is a sectional view along lines 23—23 of FIG. 25, said view being partially semidiagrammatic in character showing an eight pinion design of the "external" type utilizing helical pinions and helical side gears;

FIG. 23A is an enlarged fragmentary view, partially semidiagrammatic in nature showing a portion of the pinion to pinion and pinion to side gear mesh of the "helical" differential of FIGS. 23 and 25;

FIG. 24 is a perspective view of a helical side gear formed integrally with an axle shaft;

FIG. 25 is a longitudinal sectional view through the differential shown in FIG. 23; and FIG. 26 is a diagrammatic perspective view illustrating certain mathematical relationships that obtain with a differential and a vehicle.

Figure 1:
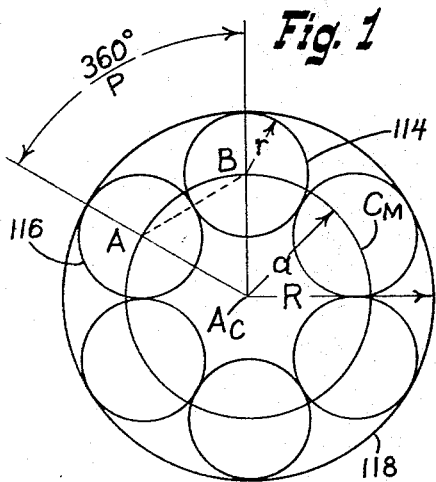
FIG. 1 is a drawing of certain geometrical and mathematical relationships of the differential of the type utilizing internal type side gears involving my inventive concepts.

A differential as used on automobiles, trucks, etc., is essentially a gear box with coaxial input and output shafts. With the housing held fixed, the gear ratio must be "minus one"; i.e., if one shaft is turned, the other must turn at the same speed but in the opposite direction. In an automobile, the housing is driven by power from the engine, and the driving wheels are attached to the coaxial shafts.

If the gearing in the differential were one hundred percent efficient, the torques on the two axles would be equal, since the efficiency of a one to one ratio gear box is equal to the ratio of the torques. This is an undesirable characteristic in an automotive differential because the vehicles must often operate under different conditions of tractive friction on the tires. Sometimes, good traction on one wheel cannot be utilized because the torque on its axle is equal to (and, therefore limited by), the poor traction on the other wheel, which then starts to spin.

The conventional bevel gear differential has an efficiency (as a gear box) on the order of ninety percent, which is the reason for its well-known tendency to spin wheels on ice, snow, loose gravel, mud, etc. Another characteristic of a relatively high "efficiency" differential that is not readily apparent to the casual observer is the tendency of one wheel of an automobile or other vehicle to spin relative to the other wheel when the road surfaces engaged by the two wheels are identical. This occurs even on dry pavement. Due to input torque from the drive shaft which causes one wheel to be lifted and the other wheel to be pressed harder on the road surface, one wheel will spin before the other wheel. Further, when a vehicle is traveling at relatively high speeds and one driving wheel hits a bump or stone or the like causing it to lift from the pavement, there will be an immediate tendency for that wheel to speed up relative to the other wheel which has maintained contact, thereby causing a relatively large shock to the differential when the lifted wheel returns and engages the road surface. A constantly inefficient differential is advantageous in that it operates in the many circumstances when there is relatively low relative motion between the two wheels, as well as during those situations of high relative motion between the two wheels. Prior art devices for eliminating the spinning between two wheels have fallen into two general classes, i.e., the constantly inefficient and the selectively inefficient or locking types. There have been many attempts in the prior art to reduce or eliminate the spinning characteristic of wheels by using a differential which has gears which are inherently less efficient than beveled gears, by adding friction surfaces to various portions of the differential, or by adding positive dog clutches and the like to the differential. Most of these devices have not found the commercial acceptance because of drawbacks such as high cost and/or diminished strength and reliability. The presently commercially available spin limiting or locking differentials are available as optional equipment at "extra cost." Some of the additional undesirable characteristics of the selectively locking or positive lock types of differentials are in the realm of reliability in that they occasionally stick which in turn causes a tendency to have axles of the vehicle break or be placed under severe strain and further, they have a tendency to cause erratic steering and the like.

The central feature of the concepts and structure of the differentials which will be explained in detail hereinafter is the provision of a useful degree of the spin limiting property without any sacrifice in economy or strength of the side gear, the pinion, and the carrier housing of the differentials shown in the drawings. By virtue of their symmetry, configurations, and the adaptation to presently well-known commercially feasible manufacturing techniques, many of the disclosed differentials are inherently more economical to manufacture than conventional bevel gear differentials while providing a significant degree of inefficiency.

As will be appreciated, several differential designs embodying certain central concepts are shown and described and certain of these designs will provide "stronger" designs and better "inefficiency" characteristics than certain others of the designs, and the inefficiency characteristics must be balanced against the inherent cost in producing the various designs, so that, in a sense, it is difficult to state which of the various designs is a "preferred" embodiment since each design has slightly different characteristics and thus, one design may be preferred for one design parameter and a different design preferred for another design parameter, etc. For example, the differential 20 shown in FIGS. 8–13 using internal side gears is basically a stronger design and has better "inefficiency" characteristics than the differential 20a shown in FIGS. 14–16 which uses external spur gear teeth for the side gears but which is more economical to manufacture. The internal gear types of differentials seem more ideally suited for trucks and off the road vehicles where loads on the differentials are high and the duty is strenuous. By and large, the external gear types offer cost-reducing advantages while providing spin limiting characteristics better than conventional differentials and thus may be more ideal for passenger automobiles and the like where the duty and environment is less strenuous. It will be noted that both the differentials 20 and 20a have the identical number of pinions (six) therein.

While FIGS. 1–15 and 19–22 are shown with spur gears and pinions, and indeed may be so constructed, these figures may also be considered as a diagrammatic showing of helical side gears and pinions. It has been determined that although it would appear that helical gears would be more restrictive as to numbers of teeth and difficulties would obtain in putting helical pinions and side gears in full circle mesh (due to the helixes on the teeth thereof, etc.) this is not the fact. As explained in more detail hereinafter ,"helical" gears and pinions provide distinct advantages and thus all of the figures where spur gears are shown and described should be considered illustrative of both the spur gear and helical gear constructions.

Returning now to FIG. 8 of the drawings, the differential assembly of the vehicle is illustrated generally by the reference numeral 20. The wheels such as 22 and 24, being at opposite sides of the vehicle must, of course, turn at different speeds when turning corners if both the wheels are to maintain a rolling (nonskidding) relation to the ground, road surface, or the like. The differential 20 allows the wheels to do this even when they are driven from the same power source. The wheels 22 and 24 are mounted on the outer extremities of axles 26 and 28 which have side gear means 30 and 32 associated therewith at the inner end thereof. As will be shown later, the side gear means may be integral with the axles 26 and 28 or fixedly attached to the axles for movement therewith as shown in FIG. 9. While the axles 26 and 28 are the conventional form of transmitting power from the differentials to the wheels, this is intended to be illustrative rather than limiting, and in the broad sense, the axles 26 and 28 may be considered to be first and second rotary means. A third rotary means 34 may be denominated a carrier means which includes a ring gear means 36 and has a plurality of first and second identical pinion means 37 mounted thereon for rotatable movement on and for rotatable movement with the carrier means. The ring gear means 36 is driven by power input means here shown in the form of a drive shaft and bevel gear means 38 although it will be obvious that the power input means may be of any suitable type such as, for example, belt drive means, electric motor means, etc.

A housing means 40 conventionally surrounds the moving parts of the differential and conventionally has bearing means illustrated semidiagrammatically at 42 associated therewith for affording relative movement of the internal parts of the differential to the housing means. It will be further appreciated that while the ring gear means 36 is shown in cooperation with a bevel gear means 38, this is illustrative only, as the important feature is that the carrier means 34 is driven in some fashion by a power input means. The carrier means 34 minus the portions for supporting the ring gear means and the extensions for cooperation with the bearings 42 is shown in exploded perspective in FIG. 13.

The differential 20 shown in FIGS. 8 through 13 is denominated an "internal" type differential, since the gear teeth of the individual side gear means 30 and 32 are directed inwardly toward the common axis of rotation of the two axles and the carrier means.

Differentials of the "internal" or "external" spur or helical gear types have been constructed heretofore but have not found commercial acceptance. The motion reversing, one to one gear train is inherent in a device which has a side gear (internal or external spur or helical), a pinion meshing with a side gear, an identical second pinion meshing with the first pinion and meshing with another side gear. Multiple pairs of pinions have also been used. Whether in single or multiple pairs, each pinion is in equilibrium between its mesh with a side gear and one other pinion. Thus, the intermediate (phasing) meshes of these prior art devices must be of a face length equal to the length of the mesh with the side gears to avoid weakening of the entire construction. The small number of full circle mesh prior art devices do not teach this concept in full generality.

A major and significant feature of the differentials of this invention is the "full circle" arrangement of the pinions in the phasing mesh as illustrated diagrammatically in FIG. 1 ("internal" side gears) and the not heretofore fully recognized advantages that accrue thereto. Such an arrangement is possible if the number of teeth in the side gear is divisible by the number of pinions meshing with it. This holds true for both internal and external types of side gears both spur and helical; i.e., the number of teeth in each individual side gear must be divisible by one half of the total number of pinions.

If P equals the aggregate total number of pinions 37 which must be an even number, and N equals the number of teeth in the individual side gears such as 30 or 32 and $n$ equals the number of teeth in each pinion, then $$\frac{N}{\frac{P}{2}}$$

equals an integer.

The "full circle" arrangement determines geometrically the relative sizes of the pinions and the side gears. There are three major advantages to the "full circle" mesh arrangement, namely, (A) Each pinion means 37 is disposed in equilibrium between one side gear mesh and two phasing meshes, and thus the length of face on which the pinions coact with each other needs to be only half the length of the face meshing with the individual side gears. This compacts the design in an axial direction.

(B) For any given number of pinion means 37 (which must be an even number) the "full circle" arrangement permits stronger coarser pitch tooth design than if the pinions were arranged in discrete pairs.

(C) The arrangement of the pinions and side gears relative to each other is a perfectly symmetrical arrangement with respect to tooth forces and bearing forces and is identical from the point of view of either axle. Further, the two side gears are identical and the pinions are identical with respect to each other which has obvious manufacturing economies (except for the necessity for left and right handedness when helical pinions and side gears are used).

Spur gears provide in some respects and in certain designs, the lowest cost and most simple design of differentials of this type. However, helical gears which can be used without difficulty give a control over the degree of inefficiency—in general, the higher the helix angle the lower the efficiency and therefore the greater the no spin property as will be discussed in much more detail hereinafter.

The geometric relationships of the relative sizes of pinions and side gears as shown in FIG. 1 as relating to the "internal" type side gears may be expressed as follows:

$$\overline{AB} = 2a \sin\left(\frac{180}{P}\right) = 2r$$

$$a = R - r$$

$$2(R-r) \sin\left(\frac{180}{P}\right) = 2r$$

$$\left(\frac{R}{r} - 1\right) \sin\left(\frac{180}{P}\right) = 1$$

$$\frac{R}{r} = \frac{1 + \sin\left(\frac{180}{P}\right)}{\sin\left(\frac{180}{P}\right)}$$

$$\boxed{\frac{R}{r} = 1 + \operatorname{cosec}\left(\frac{180}{P}\right)} \quad (1)$$

Wherein A and B respectively are the axes of individual adjacent pinions in the full circle mesh which are spaced from the axis of rotation $A_c$ by a dimension $a$. It will be noted that the axes of all of the individual pinions are parallel with the axis $A_c$ of the carrier means and the individual side gear means. $C_m$ is a circle on a plane transverse to the axis $A_c$ of radius $a$ which equals the radial distance between the axes of the side gears to the axis of any individual pinion means, P as aforementioned equals the total number of pinions and $r$ equals the rolling pitch radius of any pinion in pinion to pinion mesh.

Figure 2:
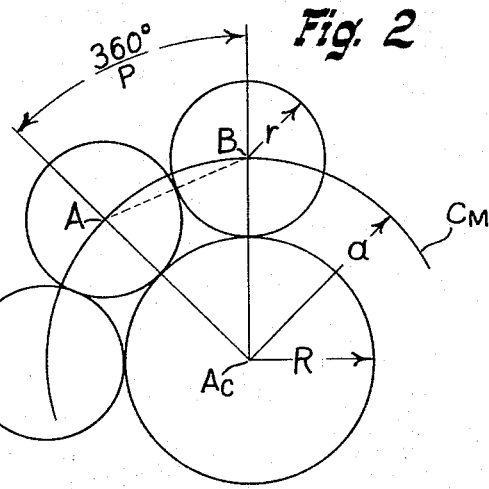
FIG. 2 is a drawing similar to FIG. 1 wherein the side gears are of the external type.
Figure 3:
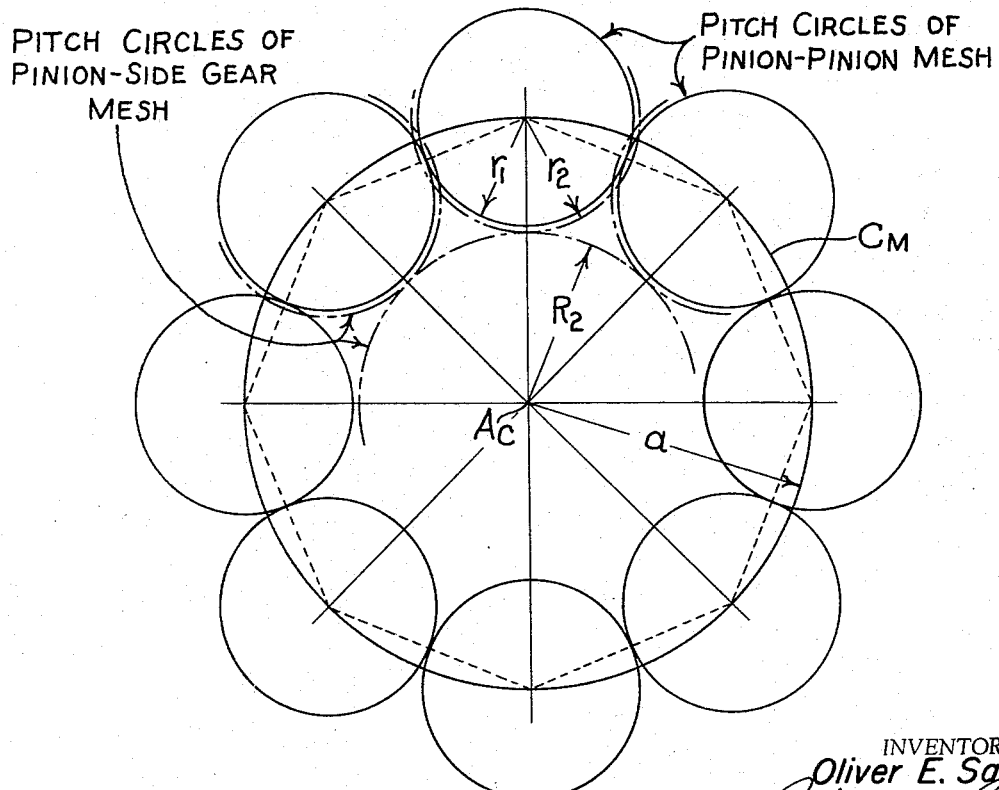
FIG. 3 is a drawing illustrating certain relationships in the rolling pitches of a differential involving my concepts.

In the "external" type of full circle design, the relationships are as shown in FIG. 2 (a ten pinion design being used for illustration). These may be expressed as follows:

$$\overline{AB} = 2a \sin\left(\frac{180}{P}\right) = 2r$$

$$a = R + r$$

$$2(R+r) \sin\left(\frac{180}{P}\right) = 2r$$

$$\left(\frac{R}{r}+1\right)\sin\left(\frac{180}{P}\right)=1$$

$$\frac{R}{r}=\frac{1-\sin\left(\frac{180}{P}\right)}{\sin\left(\frac{180}{P}\right)}$$

$$\boxed{\frac{R}{r}=\csc\left(\frac{180}{P}\right)-1} \quad (2)$$

In both the internal and external side gear cases, the following relationship should hold at least approximately:

$$\boxed{\frac{N}{n}\approx\frac{R}{r}} \quad (3)$$

Values of $R/r$ for various numbers of pinions are tabulated in the table shown in FIG. 4. As can be seen, $R/r$ is an integer or an exact ratio of two integers only in a few special cases whereas $N/n$ must always be a ratio of two integers. This means that the pitch circles of the pinions meshing with each other and the pitch circles of the pinions meshing with the side gears cannot always be identical (see FIG. 3). This must be taken into account in designing the gear teeth of both the helical and spur pinions and gears. The modifications of the above formulas that obtain, since $R/r$ is not always an integer or an exact ratio of two integers (i.e., is a transcendental number) are as follows:

For internal type side gears:

(A) $$r_1 = a \sin\left(\frac{180}{P}\right)$$

(B) $$r_2 = \frac{a}{\frac{N}{n}-1}$$

(C) $$R_2 = a + r_2$$

(D) $$r_1 \approx r_2$$

Wherein $a$ equals the radial distance between the axes of said first and second side gears to the axis of any individual pinion means, P equals the total number of first and second pinions, $r_1$ equals the rolling pitch radius of said first pinion means and second pinion means mesh, $r_2$ equals the rolling pitch radius of said first and second pinion means in pinion means to side gear means mesh, $R_2$ equals the rolling pitch radius of said side gear means in first and second pinion means to side gear means mesh, N equals the number of teeth in said side gear, $n$ equals the number of teeth in each of the individual pinion means, and $r_1$ approximates $r_2$ as nearly as possible with integral numbers of teeth.

For external type side gears, using the same definitions of terms, the following obtains:

(E) $$r_1 = a \sin\left(\frac{180}{P}\right)$$

(F) $$r_2 = \frac{a}{1+\frac{N}{n}}$$

(G) $$R_2 = a - r_2$$

(H) $$r_1 \approx r_2$$

As can be seen from the table in FIG. 4, any even number of pinions may be used with the "internal" type of side gears and any even number of pinions starting with four may be used with the "external" type of side gears. The six pinion design shown in FIGS. 8–13 has the advantage that the side gears are automatically centered by the three tooth meshes (helical or spur), thus giving essentially equal tooth loads throughout regardless of tooth profile or spacing errors in the manufacture of the gears.

Returning now to a more specific description of the structure of the differential in FIGS. 8–13, it will be seen that the inner ends of the individual axles 26 and 28 are formed with spline teeth 44 and 46 for uniting the respective side gear means 30 and 32. The side gear means 32 is of the internal spur tooth type and is comprised of two members 48 and 52, member 48 being an annular member having a hub portion directly splined to axle 28 and the outer periphery being formed with external spline teeth 50 of the same size as the gear teeth 54 on annular member 52. There are N number of teeth 54 on member 52 for cooperation with the pinion means 37 mounted on the carrier means 34. It will be noted that the tooth length of the individual teeth 54 is considerably greater than the length of spline teeth 50 and thus only the left hand portion (as viewed in FIG. 9) serves as the spline connection whereas the right hand portion serves as the active tooth surfaces of the side gear means. A few of the teeth 50 may be removed for purposes of access of lubrication to the active surfaces of the carrier and pinions as shall be explained in greater detail hereinafter. Further, it will be realized that while the internal side gear means in 32 is shown comprised of two members, they may be readily formed as an integral unit by a "shaping" process (this obtains with both helical or spur configurations). The instant construction has manufacturing advantages in that the teeth 54 may be readily broached.

The side gear means 30 also comprises two members 56 and 60 which are splined together at 58, member 60 having gear teeth 62 thereon and member 56 being splined to the axle 26. It will be observed that the side gear means 30 is identical to the side gear means 32 in size and in configuration.

Figure 13:
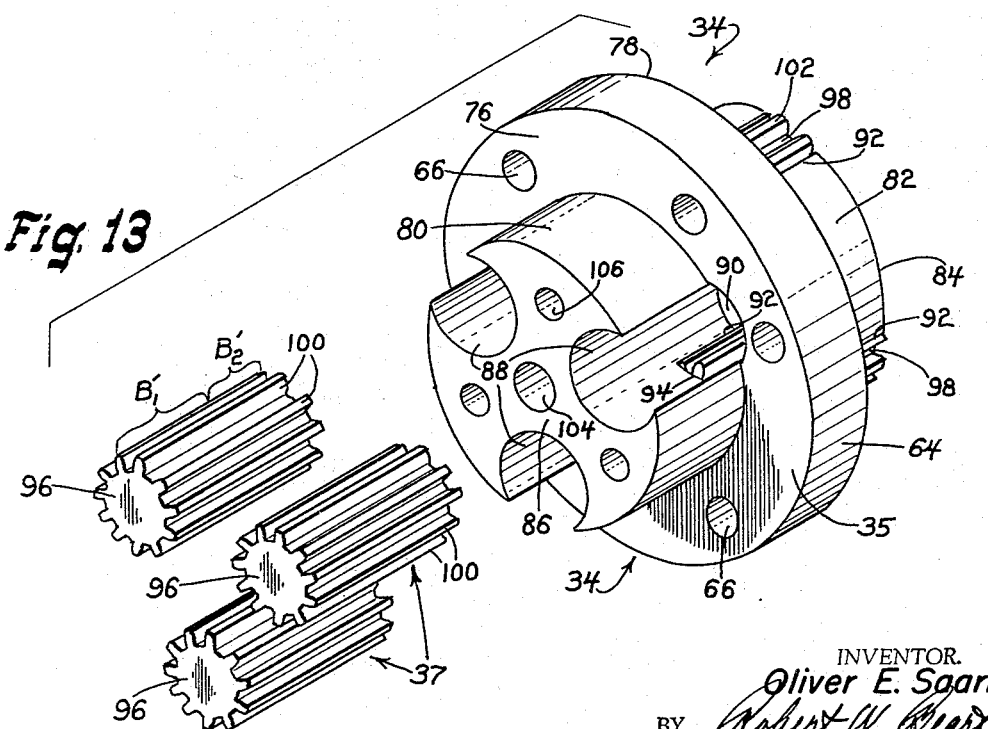
FIG. 13 is a partial exploded perspective view of the carrier means and the pinion means associated therewith.

The third rotary means or carrier means 34 has a body portion 35 having a central radially extending flange 64 (see FIG. 13). The flange 64 is formed with a plurality of through bores 66 for mounting side members 68 and 70 thereto by suitable bolts 69. It will be appreciated that members 68 and 70 are rotatively mounted relative to the hub portions of side gear means 30 and 32 and rotatively mounted relative to the housing 40 by the bearings 42 not shown in detail (and usually considerably more elaborate than shown as well understood in the art). The ring gear means 36 is mounted on member 68 and may be made integral therewith or made as a separate piece 72 which is mounted to member 68 by suitable bolts such as 74.

It will be noted that the internal diameters of carrier means side members 68 and 70 are such that members 52 and 60 of the side gears rotate therewithin with the ends of the teeth 54 and 62 on the side gear means located to rotatably engage surfaces 76 and 78 of the flange portion 64 of the carrier. Further, said teeth 54 and 62 of the side gear means 30 and 32 respectively clear surfaces 82 and 80 on the carrier means (see FIG. 13). The transverse end surfaces 84 and 86 respectively of the carrier means 34 rotatively engage the end of axle 28 and its associated gear member 48 and the end surface of axle 26 and its associated gear member 56.

As perhaps best illustrated in FIG. 13, three bore means 88 in symmetrical array extend inwardly from surface 86 each of the bores being parallel to the axis of rotation of the carrier means 34. Each bore means 88 has a terminal surface 90 which is transverse to the axis, the bore means 88 having a depth which is approximately 60 percent of the distance between surfaces 84 and 86. The bores 88 are so arranged relative to peripheral surface 80 so as to intersect same so that the teeth of the pinion means 37 disposed therein engage the side gear means 30 in the "full circle" arrangement. It will be observed that each of the bores 88 is identical in size and in depth.

Three bores 92 having a transverse terminal surface 94 enter from surface 84 of the carrier means, and each of the bores 92 having a depth which is also 60 percent of the distance between surfaces 84 and 86. The bores 92 have a diameter exactly equal to the diameter of the bores 88 and they are symmetrically located so as to be intermediate, in a sense, to bores 88 and parallel thereto. Each bore 92 intersects and communicates with peripheral surface 82. Further, each bore 92 at the interior end thereof and for a distance of approximately one third of its length and at its inner end, intersects two adjacent bores 88 which extend from the other side of the carrier means. Three identical toothed pinion means 96 are disposed in the bores 88 which may be called the first pinion means and three identical toothed pinion means 98 are disposed in the bores 92 which may be called the second pinion means. All six pinions 96 and 98 are identical in size and in configuration. As indicated diagrammatically in FIG. 13 the pinions 96 may be considered to have two discrete areas along the length of teeth 100 thereof, i.e., portions $B'_1$ and $B'_2$ which are in the ratio of 2:1 to each other. The portion $B'_2$ represents that portion of the teeth 100 of pinion 96 which is in a phasing mesh with the teeth 102 of two pinions 98 and the portion $B'_1$ represents that portion of the tooth length of the pinion 96 which is in side gear mesh with the teeth 62 of the side gear means 30, similarly the teeth 102 of pinion 98 cooperate in the same ratio with the teeth 54 of the side gear means 32 and, of course, the teeth 100 of the pinions 96.

The maximum length of the pinions 96 and 98 permissible for any one differential may be dictated by various other design parameters of the differential as a whole. For example, the dimension M shown in FIG. 8 between the two bearings 42 (on opposite sides of the differential) may be determined by the discrete distance which is the minimum spacing of the particular bearings employed for supporting the ring gear 36. Thus, the dimension M defines the outer limits for the side gear means and the pinion means as well as the carrier means. Generally speaking, it is possible to obtain greater mesh length in the pinion to side gear mesh and the pinion to pinion mesh using the concepts that are taught herein than is possible with other differentials. Thus, for a particular design parameter, maximum strength may be obtained per unit size. Conversely, for situations where the bearing 42 may be spaced closer together, equal strength to previous designs may be obtained with an axially compacted design.

It will be noted that the carrier means body portion 35 is of unitary one piece design. This is important from a number of standpoints, namely, the individual bores 88 may be formed simultaneously and the bores 92 may also be formed simultaneously in initial manufacturing by well-known techniques, and once formed, assure that there is no opportunity of misalignment of the pinions mounted therein. Further, the carrier means 34 is symmetrical as viewed from either end which prevents any opportunity for misassembly thereof. The fact that it is unitary also makes it easier to stock, store, and replace in the field. Further, it will be noted that all of the bores in the carrier means are essentially parallel with the axis thereof which greatly simplifies manufacturing techniques and the types of equipment to be employed.

The carrier means body portion 35 may be formed with an axial small through bore 104 and bores 106 and 108 in communication with bores 92 and 88 for purposes of allowing movement of lubricating fluids to the various tooth meshes and active surfaces of the differential. As aforementioned, some of the teeth 50 and 58 of the spline connection of members 48–52 may be removed so that lubricating fluids in bores 110 and 112 in members 70 and 68 respectively may have access to bores 104, 106, 108 and the active surfaces in the interior of the differential. Various other forms of placing lubricating oil and the like into the interior of the differential may also be used (which are not shown).

Figure 11:
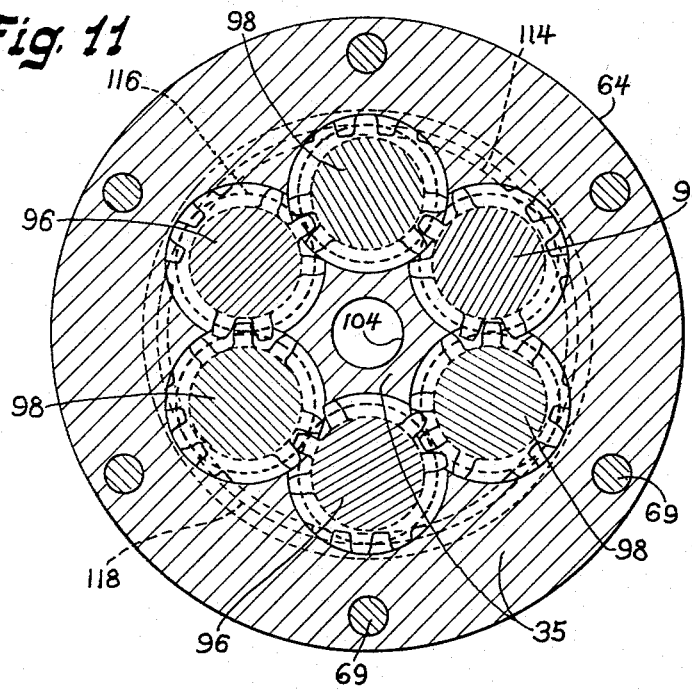
FIG. 11 is a sectional view taken along lines 11—11 of FIG. 9.
Figure 12:
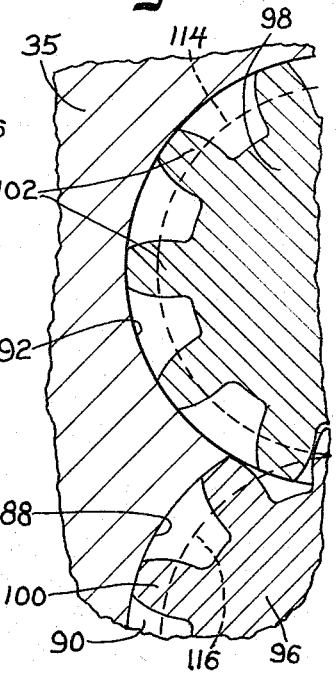
FIG. 12 is a fragmentary view, on an enlarged scale, of a portion of FIG. 11 showing the peripheral tips of the teeth of the pinions bearing upon the bores in the carrier means.

For ease of correlation of FIGS. 11 and 12 with FIG. 1, it is to be noted that the rolling pitch circle 114 of a pinion 98 and a rolling pitch circle 116 of a pinion 96 in a pinion to pinion mesh are illustrated in dotted lines in FIGS. 11 and 12 and solid lines in FIG. 1, the pitch circles 114 and 116 being identical within limits of manufacturing error. The rolling pitch circle 118 of the side gear having a radius R in the pinion to side gear mesh is also identified by a dotted line in FIGS. 11 and 12 and in solid line in FIG. 1.

Attention is invited to FIG. 12 which shows that the peripheral tips of the teeth 100 and 102 of pinions 96 and 98 respectively are configured to engage and bear upon the bore surfaces 88 and 92. The pinions are thus supported in the carrier housing bores by their outer diameters rather than on shafts or pins. In other words, the peripheral tips of the pinion teeth form the journal bearing which supports the pinions in their corresponding bores or holes in the carrier. In modern day gearing, this is highly unorthodox, however, the instant differential benefits from this feature in a variety of ways, namely:

(A) Such a mounting of the pinions results in a friction surface between the tips of the pinion teeth and the bore walls which is subjected to the same loads as the gear teeth at a sliding velocity which is higher than the pitch line velocity of the gears. This results in a predictable degree of inefficiency which would be undesirable in a power gear train but is quite advantageous in a differential.

(B) Such a mounting results in a rigid support for any length of pinions 96–98 that may be used, i.e., the pinions are mounted coextensive the entire length thereof.

(C) The pinions may be cut off from bar stock and no hole is required (unless it is desired to use such a hole for lubrication purposes (not a critical bore)), and there is no requirement for means of attaching a shaft to the pinion and mounting such a shaft to the carrier housing. Also, it is to be noted there is no possibility of misalignment due to deflections of the shafts under load.

(D) In all modern differentials, gears are submerged in extreme pressure lubricants required by the hypoid ring gears and the spaces between the pinion teeth 100 and 102 are ideal "oil grooves" carrying the lubricant uniformly to the bearing surfaces in the bores 88 and 92. This is very favorable in reducing wear and scoring problems.

Turning again to the differential 20, and considering it as a gear box with a "gear ratio" of minus unity, then if W is the angular speed of the carrier means 34, and $W_1$ and $W_2$ are the wheel speeds of the wheels 22 and 24, then the differential 20 maintains the relationship:

$$\frac{W_1 - W}{W_2 - W} = -1 \qquad (1)$$

from this it is seen that:

$$W = \frac{W_1 + W_2}{2} \qquad (2)$$

This is a perfectly symmetrical relationship with respect to the wheel speeds of wheels 22 and 24, a necessary condition for uniform driving and turning characteristics of a vehicle.

If the differential carrier means 34 is held fixed ($W=0$), then Equation 1 gives the formula $W_1/W_2=-1$ which implies that the differential 12 must be a $1:-1$ gear box. Any kind of gear train having this ratio characteristic (and, obviously, concentric input and output shaft) can be used as a differential.

If T is the torque applied by the ring gear 36 of the carrier means 34, and $T_1$ and $T_2$ are the torques applied by the axle shafts 26 and 28 on the differential 20, then (if we ignore transient inertia forces), from equilibrium we must have:

$$T + T_1 + T_2 = 0 \qquad (4)$$

Suppose E is the efficiency of the differential 20 as a gear train. This also must be a symmetrical characteristic.

If $W_1 > W_2$, then
$$T_1 = ET_2 \qquad (5)$$

If $W_2 > W_1$, then
$$T_2 = ET_1 \qquad (6)$$

If $W_1 = W_2$, the relationship $T_1$ and $T_2$ is not defined.

Consider now the case where wheel 22 has poor traction and is slipping. Then $W_1 > W_2$ and $T_1 < T_2$. The driving effort is proportional to $T_1 + T_2$. If R is the radius of the wheels 22 and 24 and F is the total driving force due to the wheels 22 and 24, then:

$$F = \frac{1(T_1 + T_2)}{R}$$

Applying Equation 5 gives:

$$F = \frac{T_1}{R}\left(\frac{1+1}{E}\right) \qquad (7)$$

This shows that the driving force depends on the torque applied to the wheel which is slipping faster, and on the efficiency of the differential gear box 20. A similar result is obtained if wheel 24 is slipping ($W_2$ is greater than $W_1$). Equation 7 shows that if the efficiency of the differential is 100% (1.0) then $F = 2T_1/R$. On the other hand, if the efficiency is very low, the unbalanced force on the driving wheels 22 and 24 makes the vehicle difficult to steer.

The bevel gears presently used in most differentials have inherently high efficiencies; allowing for bearing losses, these currently in use differentials are probably on the order of 90% efficiencies. Thus, when one wheel has poor traction, say on ice, or mud, the total driving force due to the action of both wheels is only a little greater than twice the tractive effort of the slipping wheel—2.1 times as much, if we assume 90% efficiency. The potentially greater effort of the nonslipping wheel is lost due to the near perfect torque balancing effect of the differential.

If, however, a differential 20 is made which is only 50% efficient, the driving force becomes $$F = \frac{2T}{R}\left(\frac{1+1}{5}\right) = \frac{3T}{R}$$

or three times the effort of the slipping wheel. This is a gain in tractive force of 43%.

It might be thought, on casual observation, that a 50% efficient differential would be undesirable because of power absorption on turning corners. However, this turns out to be a negligible factor due to the fact that there is very little relative speed of the axles during a turning operation. I have calculated that if the total axle length D between wheels 22 and 24 is used in an equation and the wheel diameters of current automobiles is used, and the turning circle of an automobile is considered at a single axle length D then the power absorption is on the order of ten plus percent. However, it is well recognized that the turning radius of most automobiles is in the neighborhood of four or five D and thus the actual power loss on turning corners is in the neighborhood of two plus percent under the extreme condition of turning a vehicle in its shortest turning radius. Of course, on a straightaway there is no power lost and since most curves on modern highways are "gentle" the power loss will be negligible.

The differential 20 which is of the spin limiting type puts the inefficiency into the conjugate action of the gears and pinions and into the coaction of the peripheral tips of the teeth with the surfaces of the individual bores 88 and 92. Analysis of the friction in a differential is exceedingly complex. A rough approximation of the efficiency of a differential of the types shown and discussed may be obtained using the formulas that follow, however, it must be remembered that this approximation leaves out the effects that accrue to the differential by virtue of the fact that each pinion is in three simultaneous meshes which are axially displaced; the actual mesh losses per se in the gear teeth; plus the difficult to predict features of any machined item such as surface finish, tolerances, lubrication, etc.

Referring to FIG. 5, I have illustrated a geometric analysis which applies to both internal and external side gears having a pitch circle of radius R with a torque output of $T_o$ and N teeth. A pinion having $n$ teeth has a pitch circle of radius $r$ and a peripheral tip surface of radius $r_o$. The tooth force F has a pressure angle X and a "friction circle" of radius C is shown. The term "friction circle" is a coined term and means a circle whose radius represents the displacement of the direction of the total force (normal plus friction) from the center of the circle. Angle Y equals the friction angle which is the arc tangent of the friction coefficient K. $T_i$ equals torque input to the pinion, P equals power and A equals the angular speed of the pinion, and the following formulas obtain:

Work input $= P_i T_i A_i$

Work output $= P_o = T_o A_o$ $$\frac{A_i}{A_o} = \frac{N}{n}\frac{R}{r} = \frac{N}{n}$$

$$\text{Efficiency} = \frac{P_o}{P_i} = \frac{T_o A_o}{T_i A_i} = \frac{T_o n}{T_i N}$$

$\tan y = K =$ friction coefficient $C =$ rad. of "friction circle" $= r_o \sin y = \dfrac{r_o K}{\sqrt{1+K^2}}$ $T_i = Fr \cos x + Fc$ $$T_i = F\left(r \cos x + \frac{r_o K}{\sqrt{1+K^2}}\right) = Fr\left(\cos x + \frac{r_o}{r}\frac{K}{\sqrt{1+N^2}}\right)$$

$T_o = FR \cos x$ $$\frac{T_o}{T_i} = \frac{R}{r}\left(\frac{\cos x}{\cos x + \dfrac{r_o K}{r\sqrt{1+N^2}}}\right)$$

$$= \frac{N}{n}\left(\frac{\cos x}{\cos x + \dfrac{r_o K}{r\sqrt{1+N^2}}}\right)$$

$$\boxed{\text{Eff.} = \frac{\cos x}{\cos x + \dfrac{r_o}{r}\dfrac{K}{\sqrt{1+K^2}}}} \approx 1 - \left(\frac{r_o}{r}\right)K \sec x$$

Eff. of differential $\approx \left[1 - \left(\dfrac{r_o}{r}\right) K \sec x\right]^3 \qquad (8)$ Since three meshes in series are involved in the gear train, i.e. the first side gear to pinion mesh, the pinion to pinion mesh, and the pinion to second side gear mesh.

The range of efficiencies in the differentials of the disclosed types will be in the range of 20–80 percent depending on the particular design and the amount of "inefficiency" desired. Low values are obtained by having the teeth on the pinions and side gears "helical" teeth as shown in FIGS. 17, 18, 23, 24, and 25 and the efficiencies may be designed all the way down to a few percent. Using the following values in Formula 8:

$$K=.15, \ x=20°, \ r_o/r=1.1$$

gives an approximate efficiency of 57%. By using a smaller pressure angle $x$ the efficiency will be increased and a larger pressure angle $x$ the efficiency will be decreased.

Heretofore it has been mentioned that phasing mesh between pinions is preferably only one half of the mesh length of the pinion to side gear mesh length. This is illustrated diagrammatically in FIGS. 6 and 7, FIG. 6 being a diagrammatic showing of an external type gear and pinion arrangement and FIG. 7 being a semidiagrammatic illustration of an internal type side gear differential. It will be realized that this relationship holds independent of the number of pinions involved as long as it is a "full circle" type of differential. In the external type of side gear, the external gear has teeth with a mesh length A associated with one axle 28 and a mesh length C associated with axle 26. The individual pinions have the respective mesh lengths $B_1$ and $B_2$ for meshing with side gears teeth A and pinions portion $D_2$ and $D_1$, respectively, mesh with pinion portion $B_2$ and side gear teeth C. The following relationships obtain, namely: $A=C$; $A=B_1$; $A=D_1$; $B_2=\frac{1}{2}A$; and $B_2=D_2$. The same relationships obtain as shown in FIG. 7 for the "internal" type of side gear and identical reference letters are used with the reference letters primed. There is no limit on mesh lengths involved as long as the ratios are maintained and the individual pinions may be made as long as desired for the necessary strength for the particular parameter involved. However, the fact that mesh $B_2$ and $D_2$ is one half of dimension A compacts the design in the axial direction for any particular design parameter. This ratio may be modified in helical designs when contact carry-over is desired for extremely large pressure angles.

The embodiment of the invention shown in FIGS. 14–16 is an example of a special case of "external" side gear type of differential and similar parts will be identified with similar reference numerals with the addition of the suffix "a." The differential 20a is a six pinion design in full circle mesh and is a special case in certain respects, namely, that the side gear means are integral with the axles (formed directly thereon) and the pinions and the side gear means are of the same diameter and have the same number of teeth of identical size. The particular design is also compact in the dimension transverse to the axis of the differential as well as along the axis of the differential.

FIG. 16 shows how the side gear teeth 62a are formed directly upon the end of the axle 26a to provide a side gear means 30a of the external type. FIG. 24 shows a helical gear similarly formed. The pinions 96a and 98a are, of course, identical to each other and differ from pinions 96 and 98 in that they are shown with center throughbores 120 and 122 for movement of lubricating fluids therethrough (and to also "lighten" the design). The configuration of the carrier means 34a is also different from carrier means 34 in that a central throughbore 124 therein rotatively receives the toothed ends of the two axles 26a and 28a. Further, it will be noted that the terminations 90a and 94a of the bores 88a and 92a are respectively just short of the ends 29a and 31a of the axle so that there is no rotative interference therebetween. Also, the bores 88a and 92a intersect with bore 124 as shown in FIG. 15 to permit the pinion to side gear mesh. Members 68a and 70a of the differential have a slightly different configuration due to the simplicity afforded by the geometry of the design and serve to retain the respective pinions in the carrier means against axial displacement, said members 68a and 70a being mounted to the carrier means 34a and forming a part thereof by suitable bolt means 69a as shown. Further, the side gear means 30a and 32a are centered by the three pinion meshes associated therewith.

Figure 8:
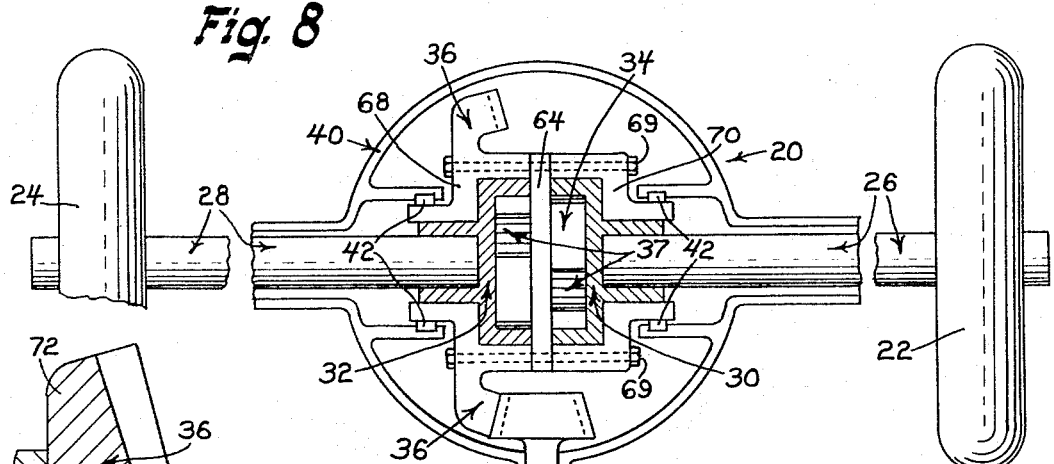
FIG. 8 is a semidiagrammatic view of an internal type side gear spin limiting differential embodying my concepts in association with axles for a wheeled vehicle and housing therefor.
Figure 9:
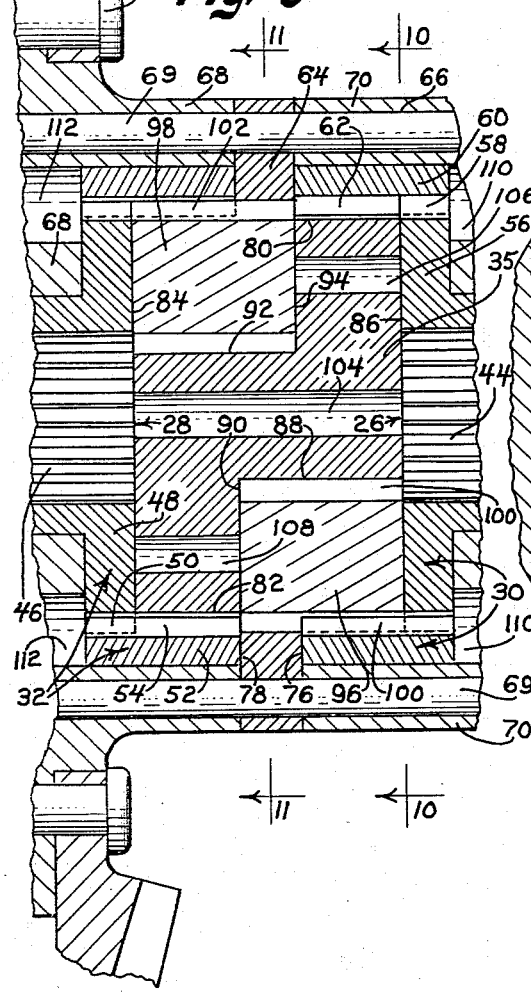
FIG. 9 is an enlarged fragmentary sectional view through the differential shown in FIG. 8.
Figure 10:
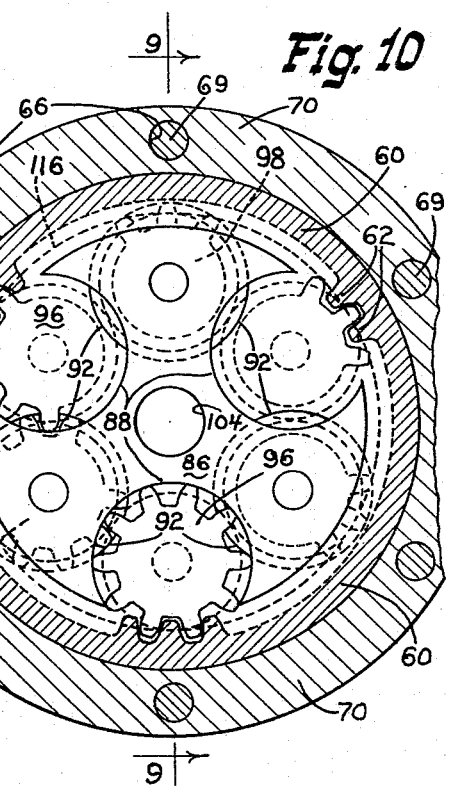
FIG. 10 is a sectional view taken along lines 10—10 of FIG. 9.

Another embodiment of the invention is shown in FIGS. 17 and 18 and similar parts will be identified with similar reference numerals with the addition of the suffix "b." The device shown in FIG. 17 is a showing of a helical design having the same number of pinions and side gears as the one shown in FIGS. 8–10, except that the pinions 96b have helical teeth 100b thereon and pinions 98b have helical teeth 102b thereon. Also, the side gear means 30b and 32b members 52b and 60b have helical teeth 54b and 62b for cooperation with the respective pinion means. The advantages of this design relative to a spur gear design will be spelled out more completely relative to FIGS. 23–26. It will be noted that the "full circle" array is maintained and the side gears are of the internal type. The removal of a tooth portion of the spline connection for lubrication is permissible here also.

Another embodiment of the invention is shown in FIG. 19, FIG. 19 being a view through a differential similar to the view shown in FIG. 11, i.e., a transverse view through the center of a differential. The embodiment 20c shown in FIG. 19 is substantially similar in concept to the foregoing and similar parts have been identified with similar reference numerals with the addition of the suffix "c." The design depicted in FIG. 19 is an eight pinion design "external" type of differential utilizing the "full circle" mesh concept. The pinions are rotatively supported on the bores of smaller size but in other respects generally similar to the foregoing embodiments. The side gear means (only one being shown) 30c is directly splined or otherwise suitably fashioned to axle 26c, the teeth 62c thereof meshing with the four pinion 96c. The pitch circles of the pinions 96c and 98c indicated as 114c and 116c are shown diagrammatically as is the pitch circle 118c for the side gear means 30c. This design is advantageous where it is desired to have the side gear means separate from the axle but would be slightly more expensive than the embodiments 20a. It will be noted that the outer diameter of the differential 20c is about the same as 20a.

Figure 21:
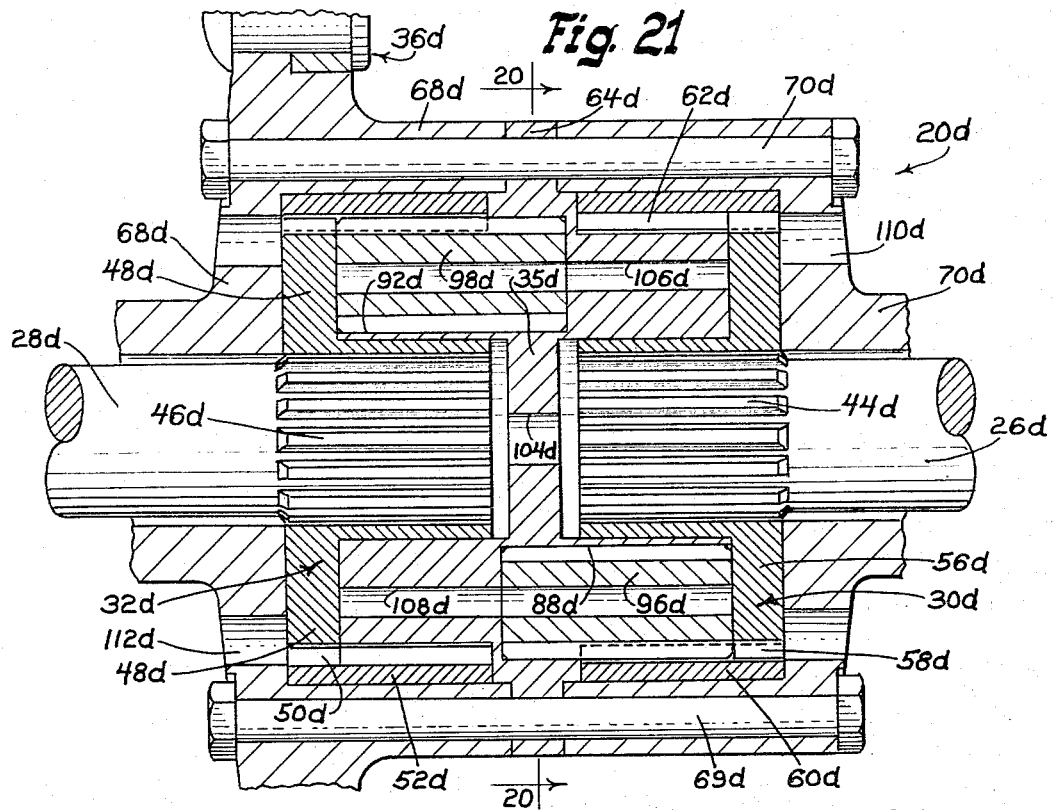
FIG. 21 is a transverse sectional view of the differential shown in FIG. 20.
Figure 22:
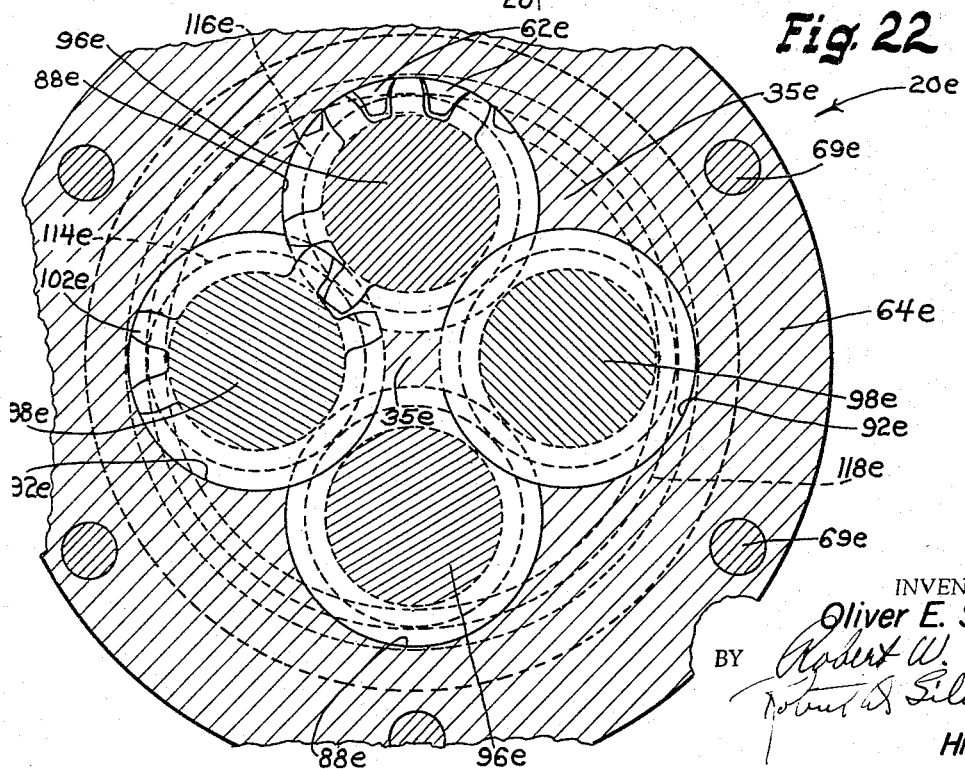
FIG. 22 is a view of still another form of differential embodying my inventive concepts.

The embodiment shown in FIGS. 20 and 21 is a ten pinion design using "internal" type side gear means and the differential 20d is substantially similar in many respects to the foregoing and similar parts will be identified with similar reference numerals with the addition of the suffix "d." The ten pinion design in "full circle" mesh shown has the following advantages over the six pinion design, namely, greater axial compactness with substantially the same O.D. of diameter but at a greater expense. Also, it is slightly more inefficient in its load carrying capacity and does not necessarily support all loads on the pinion teeth evenly.

The embodiment shown in FIG. 21 is a differential 20e which is substantially similar in many respects to the foregoing differentials and similar parts will be identified with similar reference numerals with the addition of the suffix "e." The design 20e is essentially a four pinion design, FIG. 21 being a transverse to the axis view of an "internal" type of "full circle" mesh differential taken through the center of the differential similar to FIGS. 9, 19, and 20. The pinions 96e and 98e have very coarse teeth which is advantageous because coarse teeth are stronger and the diameters being larger there is less criticality in dimensions. Further, the differential is susceptible to shell molding with teeth "as cast" for extremely inexpensive construction where precision is of small importance and strength is not a major parameter.

The embodiment 20f shown in FIGS. 23, 23A, and 25 is particularly well adapted to fit a current large volume automobile and similar parts to the foregoing differentials will be identified with similar reference numerals with the addition of the suffix "f." The differential 20f is designed to be accommodated in present banjo housings, and utilizes the presently used bearings 42f, axles 26f and 28f as presently constructed without any modifications therein. Axle 28f is slightly longer than axle 26f thereby requiring that end cap 68f be slightly thicker as measured along the axis of the axles than corresponding cap 70f so that the differential 20f will fit.

As can be seen in FIG. 23, the differential 20f may be characterized as an eight pinion external helical type of differential utilizing the full circle mesh concept with the lands 128 of the teeth 100f and 102f bearing directly upon the pockets or bores 88f and 92f respectively. FIGS. 23 and 25 are respectively drawn to full scale except for the bearing means 42f which are shown semidiagrammatically.

The side gears 30f and 32f, and the pinions 96f and 98f, as can be seen, are helical and have a transverse pressure angle of approximately 37½° and a normal pressure angle of 30°. The helix angle is approximately 41.4° for the pinions and side gears. As can be seen, in the enlarged view FIG. 23A, the pinions have five teeth and the side gears each have eight teeth, each of the individual teeth being characterized as having very wide peripheral lands 128. It will be observed that the teeth are coarse and, hence, are strong. As can be seen in FIG. 25, the helical teeth 102f and 100f, because of the lead, will provide bearing support on the pockets 88f and 92f independent of the particular angular position of the individual pinions. Stated another way, the helical design shown provides a wide land portion 128 for taking up the stresses imposed upon the bearing surfaces and distributes same uniformly to the walls of the pockets independent of the angular position of the pinions. Further, the design of the teeth as shown provides for a good "oil wedge" for lubrication purposes and the spaces between the teeth serve admirably for oil carrying grooves to assure that all the active surfaces get lubricated.

The pinions and the side gears may be made by rolling, hobbing, shaping, and the other standard forms of manufacture of helical gears. The use of the concept of "contact carry-over" of tooth contact on the helix permits the use of minimum numbers of teeth and the relatively large pressure angles involved without interruption of the tooth contact. Further, it will be realized that the gears 32f and 30f as well as the pinions 96f and 98f are identical relative to each other except for considerations of right and left handedness which merely means that the identical pinion is inserted in mirror image symmetry. Stated another way, pinion 96f is identical to pinion 98f except that they are assembled in right and left hand relationship which is true of the side gears also.

An alternate form of oil hole 126 is shown in the upper right hand portion of FIG. 25. Depending upon the location of the holes for bolts 69f for mounting the end caps 70f and 68f to the unitary differential carrier means, alternate forms of oil holes to the pockets may be necessary such as shown.

As will be appreciated, the use of helical gears and pinions necessarily causes some thrusts on the end surfaces and the unitary carrier means as shown in particularly efficacious for providing the reaction force on the internally directed end thrusts. The ends of the individual pockets 90f and 94f also are efficacious for the internally directed thrusts of the individual pinions located therein.

It will be realized from the foregoing discussion that helical gears and pinions, by and large, provide the designer with the greatest latitude in designing under the foregoing concepts. The helical gears will give the designer the smallest number of teeth and coarsest teeth as well as the widest land portions on the teeth which is, generally speaking, desirable. Further, the range of efficiencies obtainable with helical gears is considerably larger than that obtainable with spur gears due to the contact carry-over concept and due to the wider range of pressure angles available.

FIG. 26 is a diagrammatic showing of the drive shaft, differential housing, axle housing and wheels of a typical automobile. One cause of differential spin in modern high powered automobiles in the effect of input drive shaft torque on the wheels engaging the road surface. This is one of several factors that affect spinning of one wheel relative to the other (other causes, for example—unevenness of surface, different surface on different wheels, etc.). I have calculated a table illustrating the critical efficiencies to show the effect of the drive torque $T_D$ reaction on wheel spin with various surface conditions which are identical to both wheels. The drive torque $T_D$ is multiplied by the ring gear ratio P which is divided by the differential to give axle torques $T_1$ and $T_2$ which are transmitted to the wheels. This table illustrates the efficacy of a constantly inefficient differential as versus a selectively locking differential for what might be considered "normal" conditions. The efficiencies E listed in the right hand column of the table are the critical efficiency such that any figure above the listed figure of efficiency of the differential will allow one wheel to spin relative to the other wheel when sufficient input torque is applied. The table is as follows:

| Road Surface | K | E, Percent |
|---|---|---|
| Sandy Bituminous, Dry | .975 | 88 |
| Concrete (Dry) | .625 | 92 |
| Concrete (Wet) | .505 | 93.5 |
| Concrete (Oily) | .228 | 97 |
| Packed Snow (Wet) | .220 | |
| Ice (Wet) | .070 | |

The formula for deriving the figures in the above table is:

$$E < \frac{PD - Kr}{PD + Kr} \qquad (1)$$

wherein D equals the wheels span, P equals the rear axle ratio, K equals the coefficient of friction between tires and road surface, r equals the tire radius, E equals the differential efficiency with the following assumptions:

D equals 60 inches; P equals 3:1; r equals tire radius of 12 inches, and K is the tire coefficient of friction as obtained from other sources and is as set forth in the table above.

If the efficiency of the differential is less than or equal to the figure shown in the above Formula 1, one wheel will not spin alone on uniform road surfaces from this effect.

From the foregoing, it is seen that a spin limiting differential may be provided which is compact, rugged, has a minimum number of parts, and where the inefficiency characteristics may be designed to suit, which may be used in differentials where substantial torques are involved due to the geometries disclosed and in which most embodiments are the type wherein dynamic balance is maintained by the use of a plurality of pinions sets. Although specific embodiments of the invention have been shown and described, it is with full awareness that many modifications thereof are possible. The invention, therefore, is not to be restricted except insofar as is necessitated by the prior art and by the spirit of the appended claims.

What is claimed is:
1. A spin limiting differential comprising:
   first and second coaxial gear means spaced along their axis of rotation;
   carrier means disposed intermediate said first and second coaxial gear means and having an identical axis of rotation, said carrier means comprising first and second end portions as measured axially along the axis of rotation thereof;

a plurality of spaced first bore means disposed in said first end portion of said carrier means, each of said first bore means being parallel to the axis of rotation of said carrier means;

a plurality of second bore means in said second end portion of said carrier means, each of said second bore means being parallel to the axis of rotation of said carrier means, each of said first bore means intersecting at least a portion of two of said second bore means in a region of said carrier means intermediate said end portions, and each of said second bore means intersecting at least a portion of two of said first bore means in said region of said carrier means intermediate said end portions;

first pinion means disposed in said first bore means with portions of the teeth thereon in meshing engagement with said first gear means;

said first bore means having pinion supporting walls extending around at least 180° of said first pinion means in at least the areas thereof which are opposite to portions of said first pinion means engaged by said first gear means;

second pinion means disposed in said second bore means in meshing engagement with said second gear means and with at least two of said first pinion means, said second bore means having pinion supporting walls extending around at least 180° of said second pinion means in at least all of the areas thereof which are opposite to portions of said second pinion means engaged by said second gear means;

each of said first and second pinion means being identical in size and configuration;

said first and second bore means being substantially identical to each other to provide symmetrical support for said pinions to at least all the areas of said bores adjacent the area of engagement of the pinion means with the coaxial gear means;

whereby a fully circle mesh of identical sized pinions are provided, each pinion of said first and second pinion means meshing respectively with at least two other pinions and one gear means.

2. The differential set forth in claim 1 wherein said first and second gear means and said first and second pinion means are characterized as having spur gear type teeth.

3. The differential set forth in claim 1 wherein said first and second gear means and said first and second pinion means are characterized as having helical type gear teeth.

4. The differential set forth in claim 1 wherein the first and second gear means are characterized as each being internal gears with the teeth thereof directed generally toward the axis of rotation.

5. The differential set forth in claim 1 wherein the first and second gear means are characterized as being external gears with the teeth thereon directed generally outwardly from the axis of rotation.

6. The differential set forth in claim 1 wherein the teeth of said first and second pinion means respectively are in supported engagement with and bear directly upon said first and second bore means in said carrier means coextensive the entire lengths thereof.

7. The differential set forth in claim 1 wherein said first and second gear means each comprise elongated axle means each having gear teeth integral therewith for cooperation with said first and second pinion means.

8. The differential set forth in claim 1 wherein the aggregate total number of first and second pinions equals a total of six and the first and second side gear means are external gears.

9. The differential set forth in claim 1 wherein there are only two first pinion means and only two second pinion means.

10. The differential of claim 1 wherein said first and second end portions of said carrier means are on an integral body portion.

11. The differential of claim 1 wherein said pinion supporting wall in the portions of said first and second bore means which are disposed in said first and second end portions extend for a distance greater than said 180° so as to substantially completely surround said pinion means except where said pinion means is in engagement with said coaxial gear means, said supporting walls serving as bearings for said pinions and being adapted to frictionally engage said pinions to resist the rotation thereof when said pinions are rotated by said coaxial gear means.

12. The differential of claim 1 wherein each of said coaxial gear means has N number of teeth, there being P number of first and second pinion means which equals an even number, and the number of teeth N in each coaxial gear means is divisible by one half of the total number of first and second pinion means according to the formula $$\frac{N}{\frac{P}{2}}$$

equals an integer.

13. The differential of claim 1 wherein the mesh length of said first pinion means as measured parallel to the respective axes of said pinion means is approximately one half of the mesh length of said first pinion means to said first coaxial gear means and one half of the mesh length of said second pinion means to said second coaxial gear means.

14. A limited slip differential comprising first and second rotary means including respectively first and second side gear means having helical teeth in coaxially aligned spaced relationship:

third rotary means mounted to be rotated on an axis coincident with the axes of said first and second rotary means;

a plurality of first and second pinion supporting bore means in said third rotary means;

first and second helical toothed pinion means mounted in said first and second bore means for rotative movement on and rotative movement with said third rotary means in conjugate cooperation with said first and second spaced side gear means respectively, said first and second helical toothed pinion means in said first and second bore means each having an axis which is parallel to the axis of said first and second side gear means, said first and second pinion means being in conjugate cooperation with each other and characterized in that in a circular plane transverse to the axes of all of said first and second pinion means, the axis of each of the individual first and second pinion means will be located on a circle and divide the circle into equal arcs;

said first and second bore means each having walls adapted to be frictionally engaged by the teeth of said pinions when said pinions are rotated by said side gear means, whereby to resist rotation of said pinions when said first and second rotary means are rotated at different speeds.

15. The device set forth in claim 14 wherein the individual teeth of the individual pinion means are characterized as having relatively wide peripheral lands.

16. The device set forth in claim 14 wherein the helical teeth on the first and second pinion means have a high pressure angle and contact carryover is provided by the helix of the teeth.

17. The differential of claim 14 wherein each of said side gear means has N number of teeth, there being P number of first and second pinion means which equals an even number, and the number of teeth N in each coaxial gear means is divisible by one half of the total number of first and second pinion means according to the formula $$\frac{N}{\dfrac{P}{2}}$$

equals an integer.

References Cited by the Examiner

UNITED STATES PATENTS

| | | | |
|---|---|---|---|
| 874,852 | 12/1907 | Lorenz | 74—714 |
| 1,203,085 | 10/1916 | Wallace | 74—710.5 |
| 1,229,548 | 6/1917 | Vant Sant | 74—711 |
| 1,454,578 | 5/1923 | Towler | 74—711 |
| 1,869,528 | 8/1932 | Trbojevich | 74—714 |
| 2,178,613 | 11/1939 | Seeck | 74—715 |
| 2,788,679 | 4/1957 | Mott | 74—714 |
| 2,791,919 | 5/1957 | Wildhaber | 74—714 |
| 2,972,265 | 2/1961 | Walter | 74—711 |
| 2,978,929 | 4/1961 | Roberts | 74—711 |

FOREIGN PATENTS 1,147,281   6/1957   France.

DAVID J. WILLIAMOWSKY, *Primary Examiner.*

J. A. WONG, *Assistant Examiner.*